H. KRANTZ.
CORNER IRON FOR PANEL BOARDS.
APPLICATION FILED MAY 1, 1911.
1,047,084.
Patented Dec. 10, 1912.
3 SHEETS—SHEET 1.
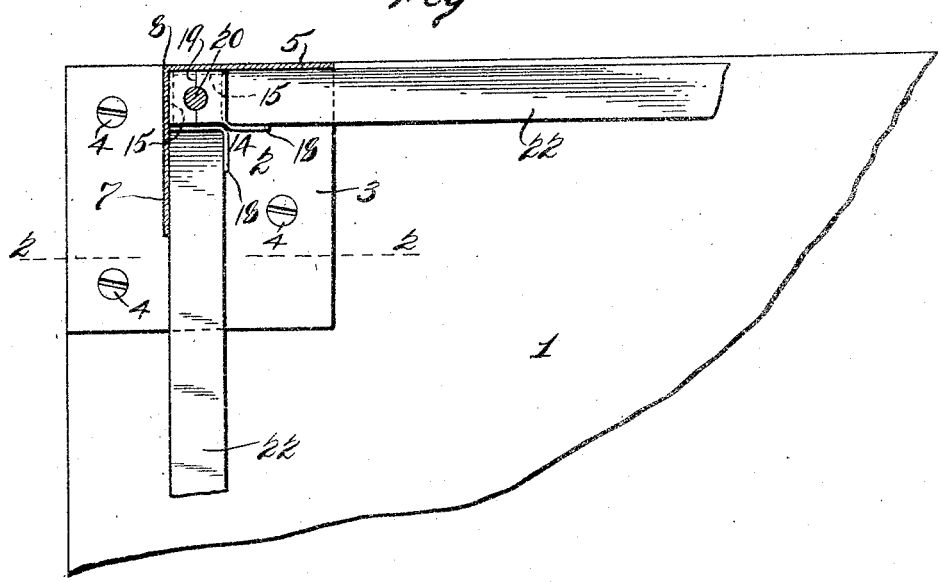
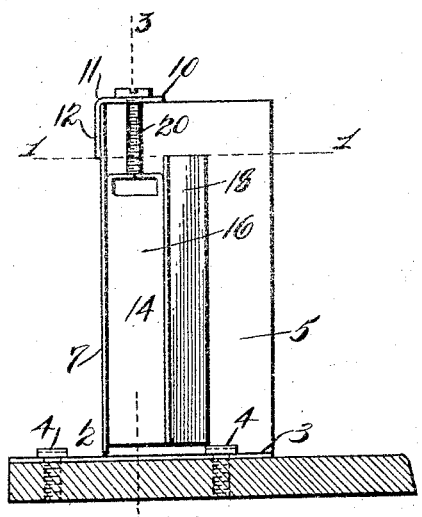
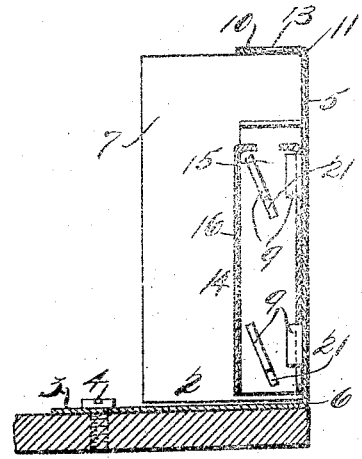
Witnesses:
E. A. Jarvis
Mabel Dittenhoefer
Inventor.
Hubert Krantz
F. Warren Wright
attorney.

H. KRANTZ.
CORNER IRON FOR PANEL BOARDS.
APPLICATION FILED MAY 1, 1911.
1,047,084.
Patented Dec. 10, 1912.
3 SHEETS—SHEET 2.
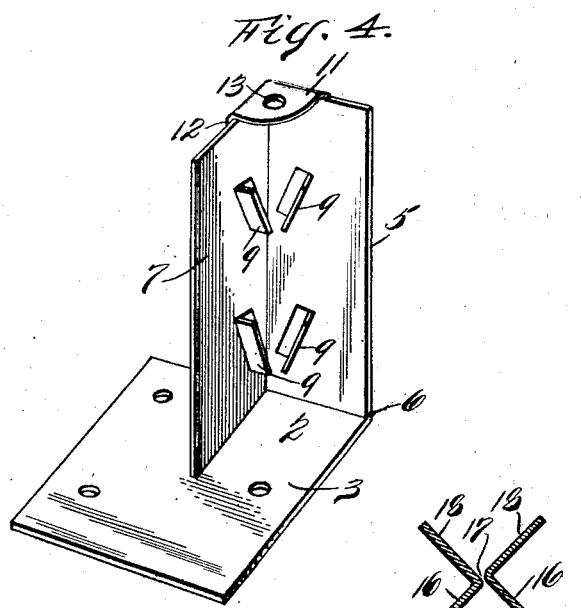
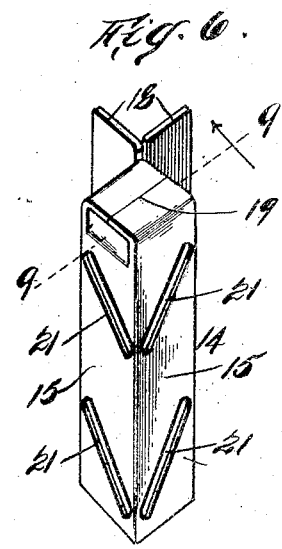
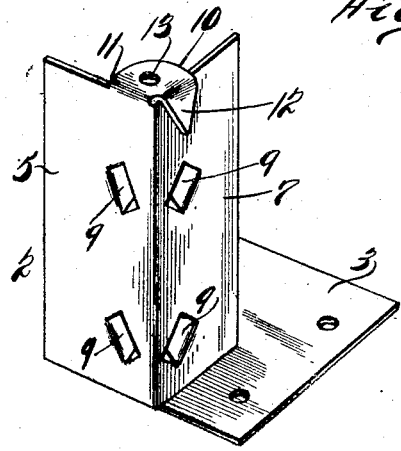
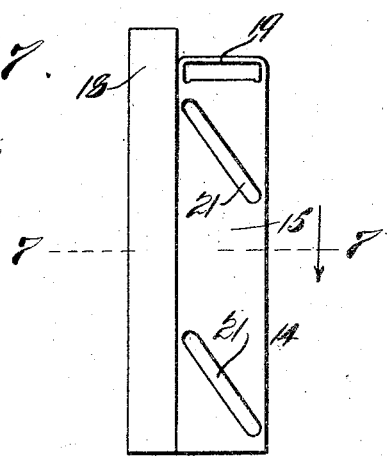
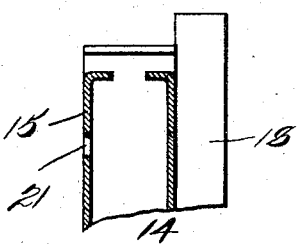
Witnesses:
C. A. Jarvis
Mabel Dittenhoefer
Inventor:
Hubert Krantz
By Warren Wright
attorney.

H. KRANTZ.
CORNER IRON FOR PANEL BOARDS.
APPLICATION FILED MAY 1, 1911.

1,047,084.

Patented Dec. 10, 1912.

3 SHEETS—SHEET 3.

Witnesses:

Inventor
Hubert Krantz

UNITED STATES PATENT OFFICE.

HUBERT KRANTZ, OF NEW YORK, N. Y.

CORNER-IRON FOR PANEL-BOARDS.

1,047,084.  Specification of Letters Patent.  Patented Dec. 10, 1912.

Application filed May 1, 1911. Serial No. 4,524.

*To all whom it may concern:*

Be it known that I, HUBERT KRANTZ, a citizen of the United States, residing at Brooklyn, in the county of Kings, city and State of New York, have invented certain new and useful Improvements in Corner-Irons for Panel-Boards, of which the following is a clear, full, and exact description.
This invention relates to so called corner irons for panel boards, to wit: metal pieces generally mounted on the four corners of a slate switch board or panel board, generally of iron; sometimes of brass or other metal, which act as supporting pieces or clamps for slate sides of the panel board. These have heretofore been made, cast, stamped or machined, and have been made in various ways.
The object of this invention is to simplify the construction so that the corner irons may be more cheaply made, more efficacious in use, and more easy of adjustment by the assembler to properly secure the clamp to the sides of the panel board. Hereinafter I will refer to sides as the slate sides, although it will be understood that marble or other material is frequently used.

In carrying out my invention I prefer to form my corner irons so that they can be made by simple stamping and bending operations from sheet metal. I also provide a wedge shaped part for coöperation with the corner iron, properly located relatively to the corner iron, but capable of being moved more or less into the angle of the same to clamp the slate sides in place. This I prefer to accomplish by the use of an ordinary set screw passing through a portion of the iron.

The scope of my invention will be pointed out in the claims.

Figure 10:
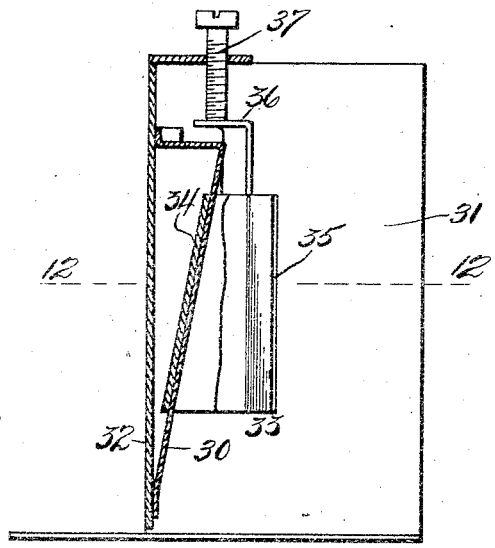
Figure 11:
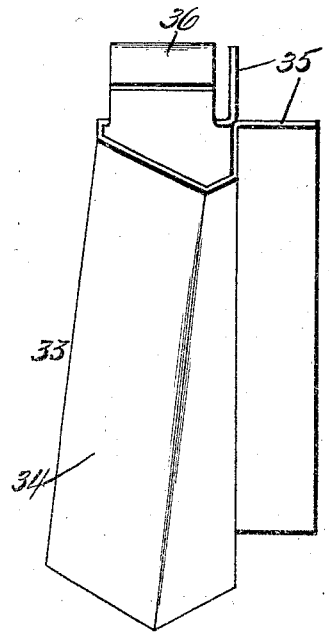
Figure 12:
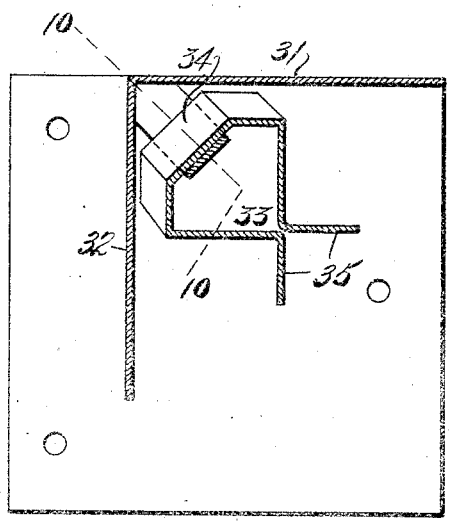
Figure 13:
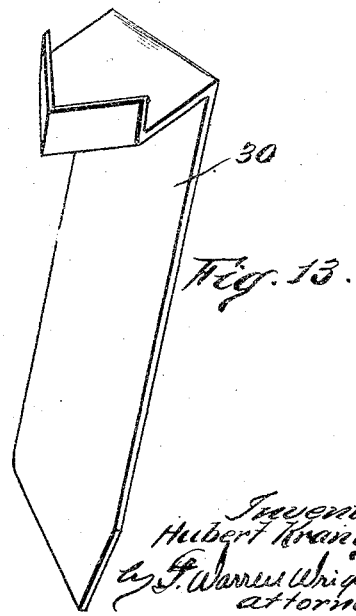

In the accompanying drawings, Figure 1 is a plan view of one corner of a panel or switch board provided with my corner iron, the corner iron itself being shown in horizontal section on line 1—1 Fig. 2. Fig. 2 is a vertical section taken on line 2—2 Fig. 1. Fig. 3 is a vertical section on line 3—3 Fig. 2. Fig. 4 is a perspective view of my improved corner iron looking into the angle. Fig. 5 is a perspective view of the same from the outside in reverse position to Fig. 4. Fig. 6 is a perspective view of the wedge and clamp. Fig. 7 is a section of the wedge or clamp on line 7—7 Fig. 8. Fig. 8 is a side elevation of the wedge or clamp. Fig. 9 is a section of the upper part of the wedge or clamp taken on line 9—9 Fig. 6. Fig. 10 is a section on line 10—10 Fig. 12 of a modified form of corner iron. Fig. 11 is a perspective view of the wedge shown enlarged of this modified form. Fig. 12 is a sectional plan view, the sections being taken on a line 12—12 in Fig. 10. Fig. 13 is a perspective view of the slide engaged by the clamp or wedge of Fig. 11 shown detached from the corner iron but ordinarily riveted or brazed to the same.

As shown in the type of corner iron illustrated in Figs. 1 to 9, 1 is the slate back plate of a panel board. 2 is the corner iron proper: it is formed of a piece of sheet metal cut and notched so that it may be folded into the position shown in the drawings, to wit: a base section 3 secured to the back plate 1 by screws 4, an upstanding plate 5 integral on a fold 6 with the base plate 3, an upstanding plate 7 integral on a line of fold at 8 with the upstanding plate 5, but not directly or necessarily connected to the base plate, although it may be. Each one of the upstanding plates 5 and 7 has punched out of its sides inwardly turned oblique lugs 9 for engagement with slots in the wedge piece to be hereinafter described. Folded out of the metal of the plate 5 I provide an ear 10 connected to the plate 5 at 11, and having an overlapping lug 12 bent over the upstanding plate 7. This ear 10 is provided with a third aperture 13 for the set screw 20 to be hereinafter described. The wedge or clamp member 14 is also preferably bent out of a single piece of sheet metal, and consists of two upstanding sides 15—15 of a folded box like part, the other two sides of which 16—16 approximately meet at the point 17, and are there turned away at right angles to form two leaves 18—18. One of the sides of the box like part 16 and the opposite side 15 have their upper ends folded over, preferably so as to meet on the line 19 Fig. 6, and there form a platform for the engagement of the said screw 20 when the device is in place. Each upstanding leaf 15—15 is provided with a pair of elongated oblique slots 21—21, each approximately twice the length of the lugs 9 of the corner piece, although such dimensions are not necessary, it only being important that they be sufficiently longer than the lugs. In view of this construction the slate side pieces 22—22 of the panel board may be inserted into the position shown in Fig. 1, after the wedge or clamp member has been placed with the slots 21 in engagement with the lugs 9, in which instance the wedge piece 14 will be up above contact with the base piece 3. By screwing down the set screw 20 the wedge clamp will be forced downwardly and in view of the oblique contacting lugs will be drawn into the corner as well as down toward the base plate, thereby firmly clamping between the upstanding walls 5 and 7 and the out-turned parts 18—18 the two slate side pieces.

As shown in the modification, Figs. 10 to 13, the corner iron itself is formed in the same manner as the corner iron of the preceding modification, except that the inturned lugs 9 are omitted and in their place, there is welded or riveted into the angle of the corner iron, an oblique slide piece shown in perspective in Fig. 13, and numbered 30. Before the piece 30 is secured to the upstanding side pieces 31 and 32 of the corner iron of this modification, a wedge or clamp member 33 is slid over the piece 30, in the position as shown in Fig. 10, so that the same may be forced up and down on the long engaging side of the piece 30, to cause the clamp to be moved toward the bottom and into the angle of the corner iron. This wedge clamp is preferably made of one piece and is provided with a wedge shaped sleeve 34 having folded out of its vertical side 2 engaging leaves 35 quite similar to the leaves 18, Fig. 7, and is provided with the turned over platform 36 to take the place of the screw 37.

The operation of this device, with relation to the back plate and side plates of the panel board of Fig. 1, will be obvious from the previous description of Figs. 1 and 9.

I claim as my invention:

1. A corner iron of the class described, comprising upstanding plates at an angle to each other, a wedge clamp in the angle having outwardly turned wings adapted to engage with the side plates of a panel board, said wedge clamp being attached to said upstanding plates so as to be capable of a limited vertical movement with relation thereto without disconnection therefrom and with a variation of distance between said wings and plates throughout said vertical movement, and means for moving said wedge clamp vertically in the angle of the corner iron.

2. A corner iron of the class described, comprising upstanding plates at an angle to each other, a wedge clamp in the angle having outwardly turned wings adapted to engage with the side plates of the panel board, said wedge clamp being attached to said upstanding plates so as to be capable of a limited vertical movement with relation thereto without disconnection therefrom and with a variation of distance between said wings and plates throughout said vertical movement, and means for moving said wedge clamp vertically in the angle of the corner iron, said corner iron being formed of folded sheet metal, and having a base plate folded at an angle to the corner plates.

3. A corner iron of the class described, comprising upstanding plates at an angle to each other, a wedge clamp in the angle having outwardly turned wings adapted to engage with the side plates of a panel board, a screw engaging ear on the corner iron, a screw therein adapted to contact with the wedged clamp, oblique engaging surfaces on the clamp and corner iron so disposed that upon shifting the wedge clamp vertically, it will be drawn into the angle of the corner iron.

4. A corner iron of the class described, comprising upstanding plates at an angle to each other, angularly disposed lugs carried by each of said plates, a clamp member adapted to fit in the corner of said plates, said clamp member being provided with angularly disposed slots adapted to receive the lugs on said plates, and means adapted to force said clamp member downwardly.

Signed at Brooklyn, New York, this 12th day of April, 1911.

HUBERT KRANTZ.

Witnesses:
J. A. NEWTON,
J. L. KOLB.

Copies of this patent may be obtained for five cents each, by addressing the "Commissioner of Patents, Washington, D. C."